Dec. 26, 1961   A. G. CLARKE   3,014,343
NOSE BULLET FOR GAS TURBINE ENGINES
Filed Sept. 5, 1956   2 Sheets-Sheet 1

*INVENTOR*
*A. G. CLARKE*
BY: *Maybee & Legris*
*ATTORNEYS*

Dec. 26, 1961  A. G. CLARKE  3,014,343
NOSE BULLET FOR GAS TURBINE ENGINES
Filed Sept. 5, 1956  2 Sheets-Sheet 2

INVENTOR
A.G. CLARKE
BY: Maybee & Legris
ATTORNEYS

United States Patent Office 3,014,343
Patented Dec. 26, 1961

3,014,343
NOSE BULLET FOR GAS TURBINE ENGINES
Alfred Gordon Clarke, Rexdale, Ontario, Canada, assignor to Orenda Engines Limited, Malton, Peel County, Ontario, Canada, a corporation
Filed Sept. 5, 1956, Ser. No. 608,163
2 Claims. (Cl. 60—39.29)

This invention relates to air intake systems for gas turbine engines and in particular to air intake systems for gas turbine engines of the type commonly used for powering jet aircraft.

Gas turbine aircraft engines generally comprise a forwardly directed air intake duct which feeds a compressor driven by a turbine, the compressor discharging compressed air into the turbine combustion chambers. In such engines, designed for high velocity air intake conditions, it has been found necessary to provide some means for varying the area of the air intake so that the velocity of the air entering the compressor may be maintained at a high level to avoid stalling of the first stage of compressor blading even though the air speed of the aircraft has been reduced below normal.

The conventional air intake for gas turbine engines comprises an annular space defined on the outside by the outer skin of the engine nacelle and on the inside by a nose bullet mounted concentrically on or forwardly of the main shaft of the engine. It has been proposed to provide a series of adjustable ramps around the surface of the nose bullet which are adapted to expand radially thereby reducing the area of the air intake and increasing the air entry velocity near the tips of the first stage blading where the increase is most effective to prevent blade stalling. The nose bullet, in these designs, is mounted either on an extension of the engine shaft and rotates with the shaft or is mounted on a stationary part of the engine or nacelle by means of struts. If the bullet rotates with the engine shaft, the rotational speed presents a serious problem with respect to the movable ramps as they become unwieldy and difficult to operate when centrifugal forces of up to 5,000 or 6,000 times gravitational weight are encountered. If the bullet is stationary it requires either support vanes in front of the first stage of compressor blades or support from a stationary part of the engine frame. Both of these requirements present difficulties in usual engine arrangements.

It is proposed by this invention, therefore, to provide such a nose bullet which is journalled for free rotation on an extension of the engine shaft and which has adjustable ramps around its surface. The rotational speed of the bullet with respect to the air frame may thus be anything from zero r.p.m. to engine r.p.m. due to bearing friction and associated forces on one hand, and aero-dynamic loads on the surface of the bullet, on the other hand. It is therefore possible, by limiting the angular velocity of the bullet to design a light and easily operable adjustable ramp without encountering excessive centrifugal forces.

According to the invention a nose bullet for gas turbine engines is mounted for free rotation on an extension of the engine shaft and comprises an outer skin which is a surface of revolution, a sleeve axially aligned with the skin and supported therefrom, a circumferential recess in the skin adjacent its rearward end, a plurality of segmented ramps lying in the recess and pivoted to the skin at their leading edges, means within the bullet to pivot the ramps from a first position flush with the bullet skin to a second position at an angle thereto, and means responsive to centrifugal force to impose an aero-dynamic force on the bullet acting in a direction opposite to the direction of rotation of the gas turbine engine.

A preferred specific embodiment of the invention is illustrated in the accompanying drawings by way of example in which the same reference numerals refer to the same parts in the various views and in which.

Figure 1:
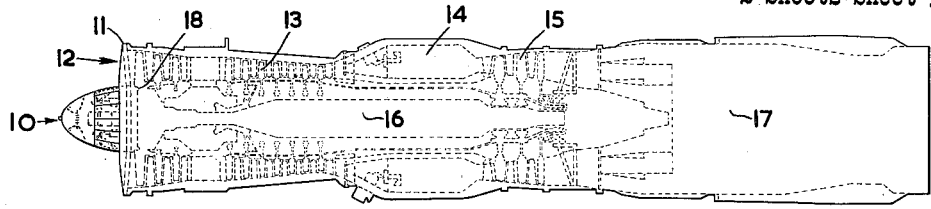
FIGURE 1 is a side elevation view of a gas turbine engine having a nose bullet constructed in accordance with this invention.

Referring now to the drawings the engine will be seen in FIGURE 1 to generally comprise a nose bullet 10 which defines between its external surface and the outer shell 11 of the engine an air inlet 12 which delivers air to a compressor 13. Air from the compressor is fed into a combustion chamber 14 where fuel is injected and burned, the products of combustion passing through the turbine 15 which drives the compressor through the shaft 16. The exhaust gases finally pass through the tailpipe 17 from whence they are ejected to atmosphere to provide a propulsive thrust.

The shaft 16 which drives the compressor 13 terminates, at its forward end, in an annular blade supporting member which is, during engine operation, rotating at engine speed.

Figure 2:
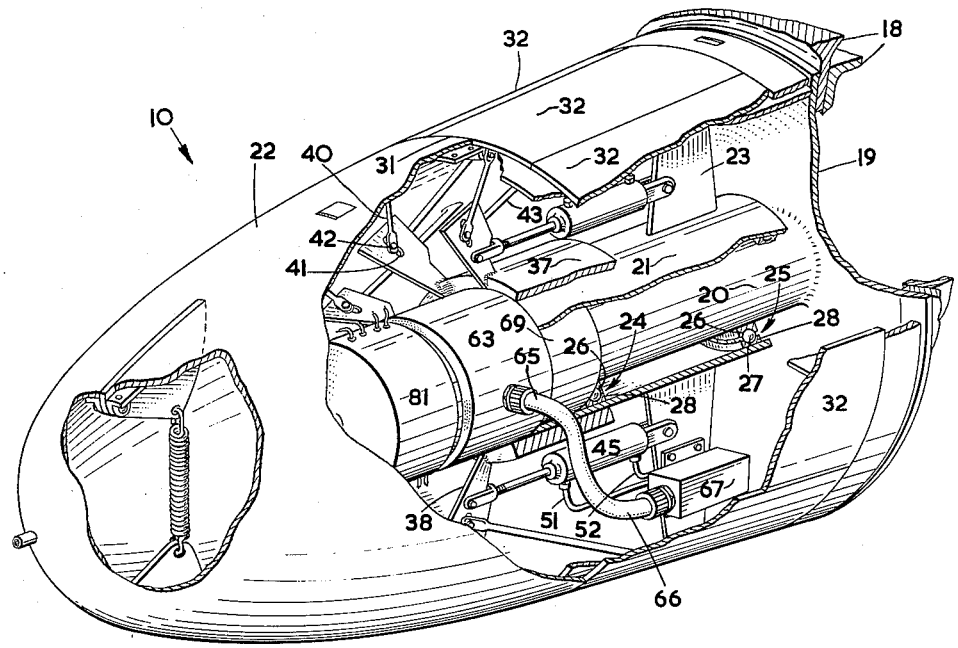
FIGURE 2 is an enlarged perspective view, partly cut away, of the nose bullet which is mounted on the engine of FIGURE 1.
Figure 3:
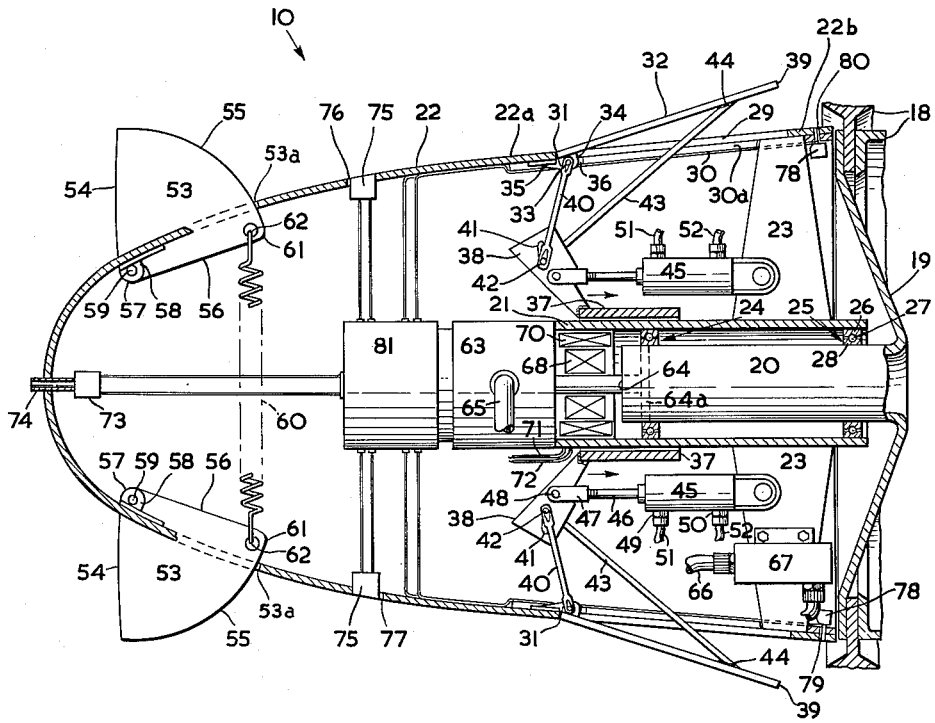
FIGURE 3 is a cross-sectional view of the nose bullet taken along its longitudinal axis and showing the internal arrangements of parts.

In FIGURES 2 and 3 it may be seen that this annular member 18 has secured thereto a disc 19 provided with a hollow central shaft 20 which constitutes an extension of the main engine shaft 16, being coaxial therewith and rotating at engine speed. Similarly the engine shaft could be extended by other means and in the following description the shaft 20 will be referred to as the engine shaft extension.

The nose bullet shown generally at 10 is mounted on this engine shaft extension for free rotation relative thereto by means of a cylindrical sleeve 21 which is held centrally and axially aligned with the bullet skin 22 by means of radially extending struts 23 secured at their inner ends to the external surface of the sleeve 21 and at their outer ends to the internal surface of the bullet skin 22. Bearings 24 and 25 comprising inner races 26 secured to the external surface of shaft 20, balls 27 and outer races 28 secured to the internal surface of sleeve 21, journal the sleeve on the shaft and permit free rotation of the bullet relative to the engine shaft extension 20 while preventing axial displacement of the bullet relative to the shaft.

The nose bullet 10 has an external skin 22 which is a surface of revolution and is of a streamlined shape so as to provide a smooth straight line flow of air into the first stage of blading of the compressor 13. Adjacent its after end, however, it is provided with a circumferential recess 29 of a depth substantially equal to the thickness of the skin 22. This recess may be formed integrally in the skin 22 by one of any of the well known metal working techniques or, alternatively, may be formed by making the bullet in two sections as shown in FIGURES 2 and 3. Here the bullet skin is comprised of a forward portion 22a and an after annulus 22b joined together by an annular member 30 which is of an outside diameter equal to the inside diameter of the forward portion and the annular after portion. The member 30 fits within the forward portion 22a and is secured thereto by suitable means such as welding. The after annular portion 22b is fitted thereover and spaced from the after edge 31 of the forward portion 22a a distance equal to the desired width of the circumferential recess 29 where it is then secured in position.

The recess 29 is fitted with a series of segmented ramps 32 which lie in edge to edge abutment and are of a length equal to the width of the groove 29. They are formed from a material of a thickness equal to the depth of the recess 29 so that when they are lying flat in the recess the outer skin 22 of the nose bullet 10 presents a smooth unbroken surface of the unobstructed flow of air over the bullet and into the compressor.

Each of the ramps 32 is pivotally mounted at its forward edge to the bullet skin 22 by pin 33 passing through bracket 34 on the ramp and bracket 35 on the interior surface of the skin 22, the annular member 30 being provided with openings 36 at these points to accommodate the pivoting mechanism. A collar 37 is slidably mounted on sleeve 21 to permit axial movement of the collar relative to sleeve 21. Extending in a radial direction from the collar 37 are brackets 38, the number of brackets 38 being equal to the number of ramps 32. Each of the ramps 32 is connected to its corresponding bracket 38 by means of a strut assembly shown in FIGURES 2 and 3 so that rearward axial movement of the collar 37 will cause the trailing edge 39 of each ramp to move outwardly in an arc having its centre at pivot pin 33. A slot 30a is provided in annular member 30 radially opposite each bracket 38 to permit struts 43 to pass therethrough to connect with ramp 32 and be secured thereto. The strut assembly associated with each ramp comprises a strut 40 secured at pin 33 by one end and slidably engaging slot 41 in bracket 38 by means of a pin 42. A second strut 43 is secured to the underside of ramp 32 at a point 44 adjacent its trailing edge and is secured to pin 42 at its other end. The slot 41 is of a length sufficient to accommodate the inward radial component of the arcuate movement of pin 42 caused by the axial displacement of collar 37.

In order to effect the axial displacement of the collar 37, at least two hydraulic cylinders may be provided diametrically opposed to one another with respect to the shaft 20. The hydraulic cylinders 45 are mounted upon radial struts 23 supporting the bullet skin 22 on sleeve 21 and have piston rods 46 secured to brackets 38 by means of yokes 47 and pins 48. Fluid ports 49 and 50 receive hydraulic fluid from lines 51 and 52 to advance or retract the piston rod 46 with respect to the cylinder which results in the forward or rearward movement of the collar 37 and brackets 38. This in turn results in the movement of the ramps through the action of the strut assembly as described above.

Due to the fact that the bearings 24 and 25 which support the nose bullet 10 on the shaft 20 cannot be made friction free, a portion of the torque of the engine shaft will be transmitted through bearing friction to the nose bullet and the bullet will rotate. The angular velocity of the bullet will vary from zero r.p.m. to engine r.p.m. depending on bearing friction on the one hand and forces tending to resist rotation on the other. Since it is desirable that the angular velocity of the bullet be kept low so that excessive centrifugal forces are not encountered means are provided to resist rotation of the bullet by applying an aero-dynamic force to the bullet acting in a direction opposite to the direction of rotation of the engine.

These means may be seen in FIGURES 2 and 3 and comprise a plurality of vanes set in pairs, one member of each pair being diametrically opposed to the other member with respect to the axis of rotation of the bullet. Only one pair of vanes are shown in the drawings but as other pairs would be of identical construction they have been omitted in the interests of simplicity. The vanes 53 are of substantially triangular shape having sides 54, 55 and 56. They are pivotally mounted at their apex 57 on brackets 58 by means of pins 59. Brackets 58 are secured to the inner surface of skin 22 of the bullet 10. A tension spring 60 joins the adjacent vertices 61 of the vanes 53 and is secured at each of its ends in hole 62 formed in each vane. The side 55 of each vane is formed as the arc of a circle having its centre at pin 59 and a slot 53a is formed in the skin 22 of the bullet 10 to permit the vanes 53 to pivot about pins 59 against the action of spring 60 from the position shown in FIGURE 2 to the position shown in FIGURE 3. Side 54 of the vanes is curved in accordance with the surface of the skin 22 so that when the vanes are retracted (FIGURE 2) the surface of the skin 22 is unbroken to permit a smooth air flow thereover.

Thus, when the angular velocity of the bullet 10 becomes sufficient for the centrifugal force acting on the vanes to overcome the opposite force imposed upon them by the spring 60, they will pivot outwardly towards the position shown in FIGURE 3. However, as soon as a portion of the vane extends beyond the surface of skin 22 the resistance of the air stream to their angular movement will tend to reduce the angular velocity of the bullet. Thus, a state of equilibrium will be reached at which state of equilibrium the centrifugal forces will be small enough to be easily withstood by the parts affected by them. To further increase the effect of the exposed vanes upon angular velocity of the bullet, they may be given an angular orientation with respect to the axis of rotation so that they will exert an aero-dynamic force on the bullet in a direction opposite to that imposed by the rotation of engine shaft extension 20 through the friction of bearings 24 and 25.

Since disc 19 is rotating at engine speed and there is no stationary connection between the interior of the bullet 10 and the engine hydraulic system, there must be provided self sufficient means in the bullet 10 to generate pressure in a hydraulic system for the actuation of cylinders 45. This may conveniently be done by mounting a rotary type hydraulic pump 63 on the forward end of sleeve 21 and connecting the shaft 64 of the pump to the engine shaft extension 20 by means of a cross pin 64a mounted within the shaft 20. Thus the pump 63 may be driven by the relative rotation between the bullet and the shaft 20 to supply hydraulic fluid under pressure to the cylinders 45. The pump 63 delivers fluid through port 65 to a pressurized supply tank (not shown) and thence through line 66 to a control valve 67 which controls the flow of fluid to the cylinders 45 through lines 51 and 52. This hydraulic circuit is not shown in the drawings since it will follow known procedures and methods and does not form an integral part of this invention in its specific embodiment. It will be appreciated that pressure relief valves and other required components will be associated with the system and it will also be appreciated that these components will be mounted within the nose bullet in such a manner that they will be balanced with respect to the rotation of the bullet so that vibrations will not be set up due to any eccentric positioning of weight within the bullet.

Since there is no convenient means whereby connection may be established between the interior of the nose bullet and the engine control systems, means must be provided in the nose bullet also to operate the control valve in response to the varying conditions in the air flow into the compressor. These means in their specific embodiments do not form a part of this invention since electrical and mechanical means of various sorts are well known in the art for accomplishing this purpose. However, a convenient mechanism will be described generally as an example of the type of system contemplated by this invention.

A shaft 64 which rotates with shaft 60 at the engine speed and drives the rotary impeller of the hydraulic pump may also carry, at 68, an armature for an electric generator 69. The armature 68 rotates within field coils 70 secured to the internal surface of sleeve 21 and the relative rotation between sleeve 21 and shaft 20 will generate an electric current which will be delivered to leads 71 and 72 which power a converter 81.

The desired position of the ramp 32 relative to skin 22 of the bullet 10 will depend upon a number of variable factors such as ram velocity and pressure of the air at the inlet, air temperature and air speed of the aircraft. Aircraft speed can be readily determined by a pressure sensing element 73 mounted at the forward end of the bullet 10 and exposed to ram pressure through an opening 74. This device may be similar or identical in nature to one of the well known devices which are currently in use for determining air speed.

Air temperature may be determined by positioning a thermistor 75 on the skin 22 and exposing it to the air stream through an opening 76. In order to maintain the balance of the nose bullet so that rotation thereof will not set up vibrations, a second thermistor 75 may conveniently be located diametrically opposite the first mentioned thermistor and be exposed to the air stream through opening 77 in the skin 22. Similarly, air velocity at the inlet may be determined by a pair of pressure sensing devices 78 mounted at diametrically opposite points on the skin 22 where they may be exposed to the air stream through openings 79 and 80. Each of the sensing elements 73, 75 and 78 will deliver a reading to a converter 81 where the readings will be transformed into an impulse which may be fed to the control valve 67 to actuate the hydraulic cylinders 45 in accordance with the conditions of the air flow into the compressor inlet. The readings which may be transmitted to the converter can be of a pneumatic, hydraulic or electrical nature and any one of a number of well known mechanisms may be provided within the converter to transform these readings into an information signal which can be applied to the valve actuating mechanisms.

The valve actuating mechanism (not shown) is also, in itself, unimportant to this invention and could comprise a solenoid operated by an electrical impulse from the converter 81 or a small electric motor which through a suitable mechanical linkage could actuate the control valve 67. Other suitable means for effecting the actuation of the control valve will readily occur to those persons skilled in the art.

From the above description it will be readily apparent that a nose bullet has been provided having adjustable ramps around its circumference which does not suffer from the disadvantages of previously proposed constructions. The position of the adjustable ramps is automatically controlled by an actuating mechanism which is housed within the bullet and which is independent of the remainder of the engine and is responsive to those conditions which require a variation in the air intake area to prevent stalling of the first stage of blading.

The description and illustrations of the preferred embodiment of the invention presented in this specification are not to be construed as limiting but rather as illustrative of the invention, the scope of the invention being particularly set forth in the appended claims.

What I claim as my invention is:

1. A nose bullet for a gas turbine engine mounted for free rotation on an extension of the engine shaft comprising an outer skin which is a surface of revolution, a circumferential recess in the skin adjacent its rearward end, a plurality of segmented ramps lying in the recess and pivoted to the skin at their leading edges, hydraulic cylinders within the bullet connected to the ramps by means of a strut assembly passing through slots in the bullet skin to pivot the ramps about their leading edges from a first position flush with the bullet skin to a second position at an angle thereto, vane means to extend from the skin in response to centrigual force to impose an aerodynamic force on the bullet acting in a direction opposite to the direction of rotation of the gas turbine engine shaft to cause the nose bullet to rotate at a speed slower than that of the engine shaft, an hydraulic pump mounted stationary relative to the bullet and having a shaft connected to the engine shaft so as to be driven by relative rotation between the bullet and the engine shaft to supply hydraulic fluid to an hydraulic reservoir, electrical generator means in the nose bullet driven by the relative rotation of the engine shaft and the nose bullet to supply electrical energy, and control means powered by the generator and responsive to changes in conditions on the external surface of the nose bullet to control the flow of fluid to the hydraulic cylinders.

2. A nose bullet for a gas turbine engine mounted for free rotation on an extension of the engine shaft comprising an outer skin which is a surface of revolution, a circumferential recess in the skin adjacent its rearward end, a plurality of segmented ramps lying in the recess and pivoted to the skin at their leading edges, hydraulic cylinders within the bullet connected to the ramps by means of a strut assembly passing through slots in the bullet skin to pivot the ramps about their leading edges from a first position flush with the bullet skin to a second position at an angle thereto, vane means to extend from the skin in response to centrifugal force to impose an aerodynamic force on the bullet acting in a direction opposite to the direction of rotation of the gas turbine engine shaft to cause the nose bullet to rotate at a speed slower than that of the engine shaft, a source of pressurized hydraulic fluid and a source of electrical energy within the bullet and independent of the engine, an electrically powered control means controlling the flow of hydraulic fluid from the source to the hydraulic cylinders in response to conditions on the external surface of the nose bullet.

References Cited in the file of this patent

UNITED STATES PATENTS

| | | |
|---|---|---|
| 2,194,890 | De Seversky | Mar. 26, 1940 |
| 2,510,506 | Lindhagen et al. | June 6, 1950 |
| 2,763,426 | Erwin | Sept. 18, 1956 |

FOREIGN PATENTS

| | | |
|---|---|---|
| 1,010,604 | France | Mar. 26, 1952 |